Dec. 24, 1946.  J. J. CARMO  2,412,951
POULTRY FEEDER
Filed Aug. 6, 1943  3 Sheets-Sheet 1
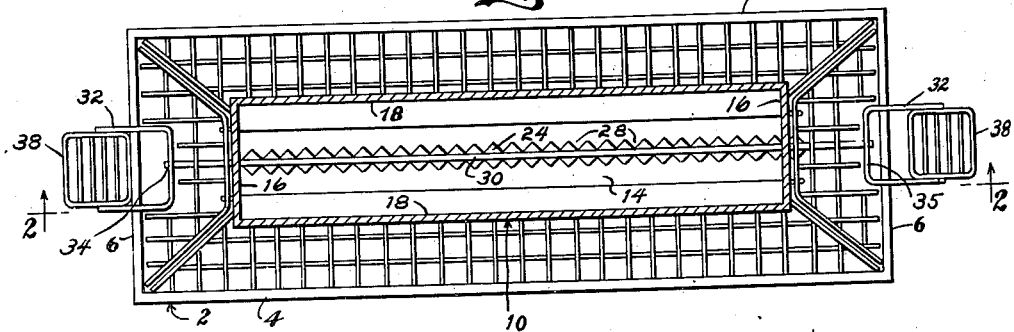
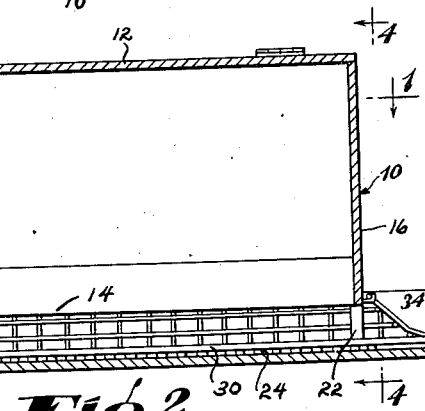
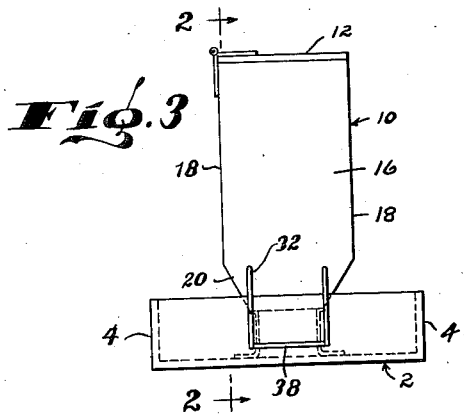
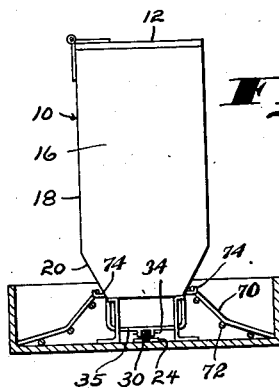
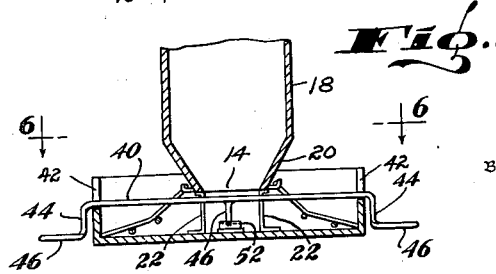
Inventor
John J. Carmo
By C. Yardley Chittick
Attorney

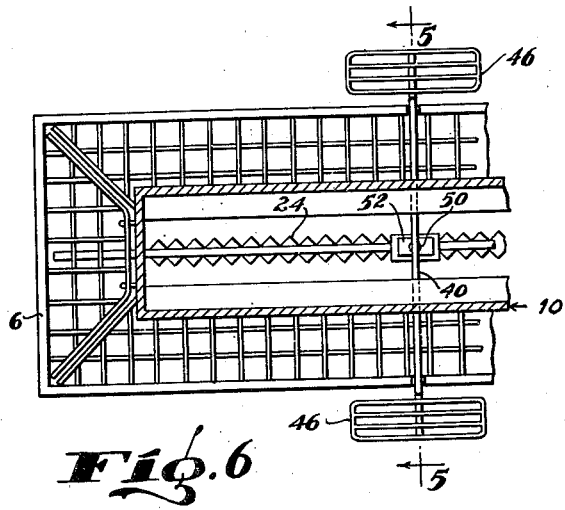
Fig. 6
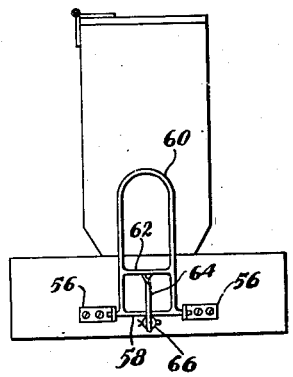
Fig. 7
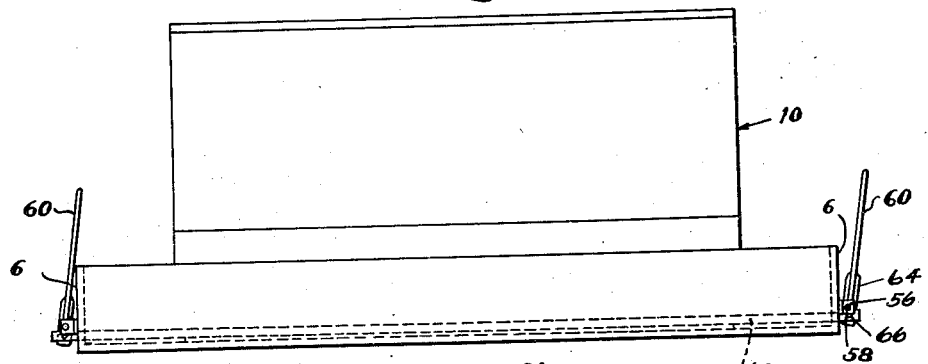
Fig. 8
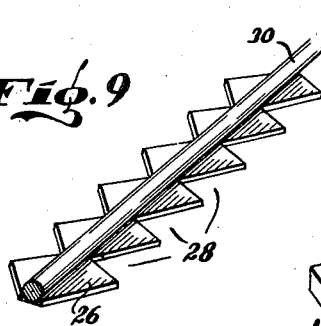
Fig. 9
Fig. 10
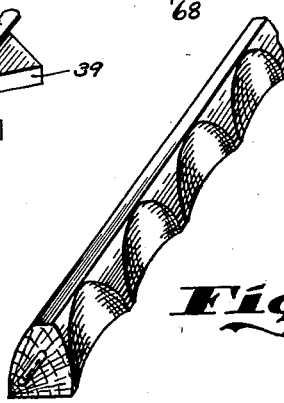
Fig. 11
Fig. 12
Inventor
John J. Carmo
Attorney

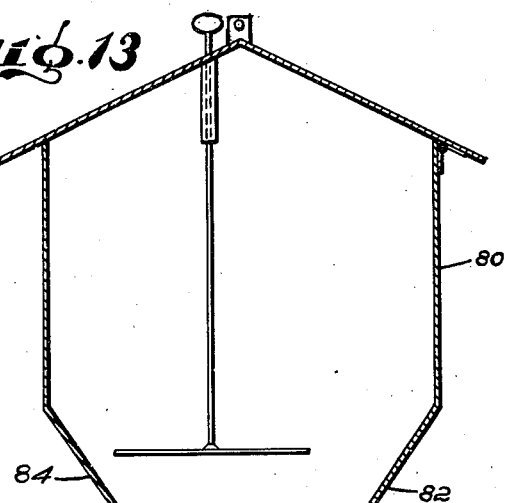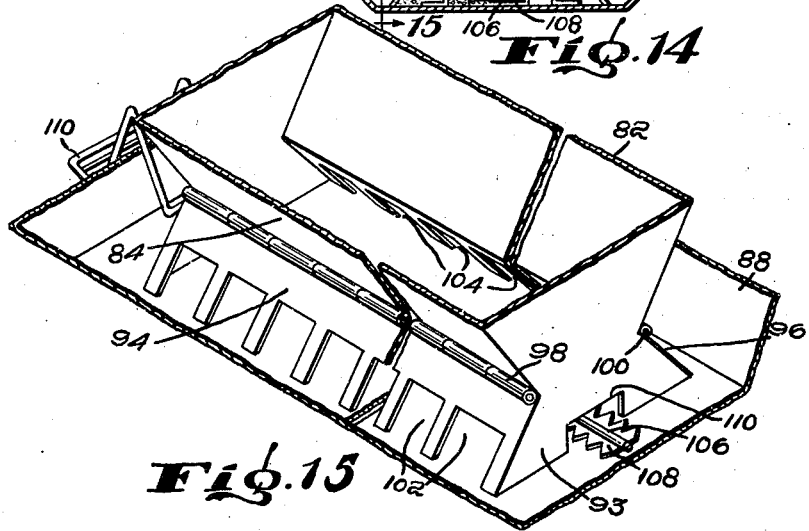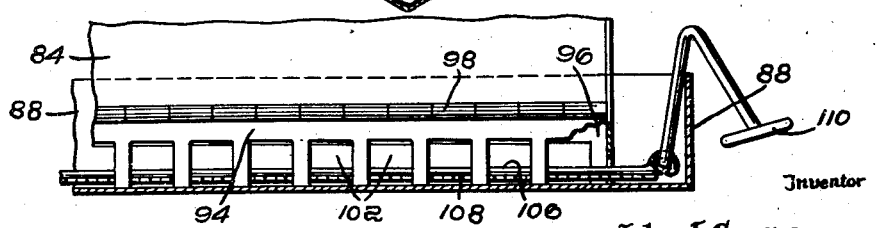

Patented Dec. 24, 1946

2,412,951

UNITED STATES PATENT OFFICE 2,412,951

POULTRY FEEDER

John J. Carmo, Billerica, Mass.

Application August 6, 1943, Serial No. 497,607

14 Claims. (Cl. 119—55)

This invention relates to poultry feeders and is concerned particularly with the provision of means that may be operated by the birds themselves to induce suitable flow of chicken feed from the hopper to the trough.

It is well known that poultry prefer to eat fresh feed rather than stale. Therefore, it is desirable that the operation of the feeder be such that the feed presented to the birds be a continuously replenished thin layer of fresh feed rather than a thick layer, of which the under part soon becomes stale, to affect adversely the entire feed supply.

One of the objects of this invention is the provision of a construction in which the relationship between the hopper and the bottom of the trough is such that feed in the hopper will not flow of its own accord to the trough sides, but on the other hand, can be induced to flow in the desired amount through movement of a special agitator blade which will be more particularly disclosed hereafter.

Another object of the invention is the provision of appropriate means operable by the birds themselves for causing movement of the agitator blade to an extent sufficient to insure the desired flow of the feed.

These and other objects of the invention will become more apparent as the description proceeds with the aid of the accompanying drawings, in which Fig. 1 is a horizontal section on the line 1—1 of Fig. 2.

Fig. 2 is a vertical section on the line 2—2 of Figs. 1 and 3.

Fig. 3 is an end view of Figs. 1 and 2.

Fig. 4 is a cross-section on the line 4—4 of Fig. 2.

Fig. 5 is a cross-section on the line 5—5 of Fig. 6.

Fig. 6 is a cross-section on the line 6—6 of Fig. 5.

Fig. 7 is an end view similar to Fig. 3 and disclosing a modified device against which the bird may push.

Fig. 8 is a side view, disclosing the agitator-moving mechanism shown in Fig. 7.

Fig. 9 is a perspective of one type of feed agitator.

Fig. 10 is a perspective of a modified type having a considerably thicker blade.

Fig. 11 is a perspective of still another type of agitator of greater depth.

Fig. 12 is a plan view of the agitator shown in Fig. 11.

Fig. 13 is a cross section of a modified form of hopper.

Fig. 14 is a perspective view broken away in part of the lower portion of a feeder of the general type shown in Fig. 13, with the hopper supported by its ends.

Fig. 15 is a vertical section on the line 15—15 of Fig. 13, enlarged and broken away in part, showing the general formation of the construction of Fig. 13, but with the hopper supported by the ends thereof rather than by the legs as shown in Fig. 13.

Referring to Figs 1 and 2, there is shown a trough 2, rectangular in shape, having side walls 4, end walls 6, and bottom 8. Positioned over the trough is a hopper 10 having at the top a hinged cover 12 and an open bottom 14. The ends of the hopper are denoted at 16 and the sides at 18.

As can be seen in Figs. 3, 4, and 5, the sides 18 turn inwardly at 20 to form a reduced opening at 14 a suitable distance above the trough bottom 8.

Any suitable means for supporting the hopper 10 with respect to the trough may be used. One convenient type is shown in the form of legs 22 (see Fig. 5) located at the four corners of the hopper.

The spacing of the hopper from the trough bottom is determined by the characteristics of the feed that is to be used therewith. If the hopper opening is too close to the trough bottom, the feed will not flow a suitable distance toward the sides of the trough, even though disturbed by the agitator means herein provided. On the other hand, if the hopper is too far above the trough bottom, then the feed, when agitated (and in some cases, without agitation) will flow in excessive amounts toward the trough sides, which will result in the accumulation of stale feed at the trough bottom.

Accordingly, the distance of the hopper from the trough bottom must be experimentally determined through the operation of the particular agitator and the feed that is to be used.

The agitator is of peculiar and novel construction and is designed to rest on or be positioned very close to the bottom of the trough. The movement of the agitator, one form of which is shown at 24 in Figs. 1 to 6, is longitudinal, as distinguished from transverse. The special construction of the agitator blade results in a sufficient lateral force being exerted on those particles of the feed close to the bottom to result in a steady although slow movement of the feed particles downward and laterally toward the trough sides until a sufficient accumulation of feed in the trough has developed that will present such resistance to lateral flow that further continued movement of the agitator bar will be unable to cause further outward flow of feed.

This condition will prevail until the birds have consumed a sufficient quantity of the feed to reduce the lateral resistance, whereupon the continuing movement of the agitator will re-establish lateral flow to build the feed level again up to the predetermined degree.

One form of agitator bar which I have found particularly effective is shown in plan in Figs. 1 and 6, in side elevation in Fig. 2, in sectional end elevation in Figs. 4 and 5, and in perspective in Fig. 9.

This construction plainly shown in Fig. 9 consists of a thin sheet of material 26 cut along its edges in saw-tooth fashion, as at 28. If the blade 26 is sufficiently stiff to stand longitudinal pressure without buckling, then no additional support is needed. However, in order to insure rigidity of the thin metal, I prefer to have a supporting rod 30 to which the blade 26 is affixed on the under side.

Blade 26 preferably rests directly on the bottom 8 of the trough although it might be supported a very short distance thereabove and still produce the same results.

One means for inducing longitudinal movement of the agitator is provided through the use of the mechanism shown in Figs. 1 to 4. This arrangement is capable of being operated by birds themselves. The construction consists of a pair of stiff inverted V-shape wires 32, the lower inner ends of which are hingedly connected with bar 30 at 34 by cross bar 35. Part way up the inner legs of members 32 engagement is made with the upper edge of end wall 6 at 36, which points of contact act as fulcrums. The outer legs of member 32 have connected at their lower ends a platform 38.

When the agitator bar 24 is at the right, as in Figs. 1 and 2, the right-hand platform 38 will be raised and away from the right-hand end 6, while the left-hand platform 38 will be down and close to the left-hand end 6. Obviously, if a bird hops on right-hand platform 38, the platform will be depressed and agitator bar 24 will be moved to the left. Thereafter, if a bird steps on the left-hand platform 38, the agitator bar will be moved to the right. Since it is well known that chickens gathered about a feed trough will continually step on and off any platforms associated therewith, the result of this construction is that the agitator bar is repeatedly moved back and forth in the manner just described.

If the hopper has feed therein, the repeated longitudinal movement of agitator bar 24 will cause gradual lateral movement of the feed as heretofore mentioned. The reason for this movement is believed to be as follows: With the bar stationary, feed particles will fill the saw-tooth spaces 28. When the bar is moved in one direction, the forward edges of the saw teeth act as wedges and drive a certain amount of the feed that is engaged by the advancing edge laterally, and at the same time immediately behind the following edge there develops a partial void into which feed from above immediately falls.

When the movement of the blade is reversed, the feed that has just descended into the voids is then wedged out sideways and additional feed falls into the newly created voids behind the following edges which were previously the advancing edges. This action is repeated again and again, gradually forcing feed laterally into the trough. Finally, however, there comes a time when the resistance of the feed that has accumulated in the trough is sufficiently great so that further movement of the agitator blade is ineffectual. Only after some of the feed has been consumed by the birds, does further lateral flow take place.

It will be apparent that once the principle of the present agitator is disclosed, further modifications at once suggest themselves. Two such modified forms are shown in Figs. 10 and 11.

Fig. 10 is similar in plan view to Fig. 9, the difference residing, however, in the thickness of the blade, as shown at 39. This construction results in an increased lateral movement of feed and may be employed under such circumstances as require the movement of a different type of feed or the movement of the feed through a greater distance or in greater quantity.

Figs. 11 and 12 disclose another form of agitator which utilizes the same principle as those shown in Figs. 9 and 10. It differs in this respect, however, that the depth is considerably greater but the angularity of the teeth is reduced. By this arrangement, the feed is moved a less distance sideways, but in greater volume. The resulting effect is the same, however.

In Figs. 5 and 6, and 7 and 8, are shown two other constructions that are capable of operation by the birds to cause oscillating longitudinal movement of the agitator.

In Figs. 5 and 6 a bar 40 extends crosswise of the trough, resting at the bottom of slots 42. The outer ends of bar 40 turn downwardly at 44 and have connected at the ends thereof platforms 46. At the center of bar 40 depends a finger 48 which fits within an opening 50 of a member 52 which is connected to the agitator bar 24. It will be understood, of course, that the agitator bar may be any one of the several forms disclosed or any equivalent thereof.

When birds hop on the platforms 46, the latter will be caused to tilt back and forth, thus moving finger 48 correspondingly to cause repeated longitudinal oscillations of agitator bar 24. The movement of platforms 46 may be limited by the use of suitable stops (not shown) or by engagement of the end of the agitator bar with the end wall 6 of the trough.

Another construction which may be operated by birds is shown in Figs. 7 and 8. It has been experimentally determined over a long period of time that chickens, in their desire to reach food, will voluntarily insert their heads through yoke-like structures such as shown in Figs. 7 and 8 and can press thereagainst with considerable force.

By arranging the leverage, it is possible for a chicken to exert enough force against the yoke to move an agitator bar of the type described a sufficient distance to bring about the necessary flow of feed.

The details of this construction shown in Figs. 7 and 8 are as follows. Angles 56 support a shaft 58 which has extending upwardly therefrom an inverted U-shaped yoke 60. Across the yoke a short distance up from shaft 58 is a cross bar 62. Connected to this cross bar and shaft 58 is a lever arm 64 which extends below shaft 58. The lower end of lever arm 64 is pivotally connected at 66 to the end of agitator bar 68, which extends through both ends 6 of the trough. It will be understood that agitator bar 68 is likewise of a type heretofore described and is designed to agitate the feed upon being suitably oscillated in a longitudinal direction.

On referring to Fig. 8, it will be observed that when the left-hand yoke 60 leans to the right against left-hand end 6 as shown, agitator bar 68 will be drawn to the left, while the right-hand yoke 60 will be swung correspondingly to the right away from the right-hand end 6. With the mechanism in this position, a bird will shortly place its head through right-hand yoke 60 and on pressing thereagainst will cause movement of agitator bar 68 to the right and left-hand yoke 60 will swing to the left.

As long as there are birds in the vicinity of the trough, continued oscillation of agitator bar 68 is assured. Since it is only necessary that the agitator bar move a limited distance in each direction, the distance between shaft 58 and pivotal connection 66 may be small so that the necessary leverage to move the agitator may be easily obtained.

A further feature of my invention is disclosed in Figs. 4 and 5. Therein is shown a form of grillwork which accomplishes the dual result of permitting easy feeding, while at the same time rendering it impossible for the birds to bill feed from the trough.

This construction contemplates an open-mesh grill consisting of crosswise wires 70 and longitudinal wires 72. The innermost longitudinal wire on each side is supported by hooks 74 which may be conveniently spaced along the bottom edge of the hopper. Crosswise wires 70, however, are not straight, but rather are concave upwardly. By this arrangement, the portions of the grill close to the sides of the trough are at such a flat angle that the feed will be very close to the level thereof or even in some cases may slightly cover the bars. At the inner part, however, where the birds are not so likely to feed, the distance between the grill and the feed will be increasingly greater. This construction not only facilitates feeding but is also an improvement over the straight grillwork as the resistance to the flow of feed from the hopper is changed to such an extent that the feed moves more freely and evenly. The grillwork may likewise extend across the ends of the trough, as shown in Figs. 1, 2 and 6.

A further modification of my feeder is shown in Figs. 13, 14 and 15. In this construction additional means is provided for limiting the amount of feed that may be exposed to the air so that the feed which is presented to the birds will be continuously fresh.

Since feed becomes stale upon exposure to air, it is apparent that if means is provided for limiting the amount that is exposed and also, at the same time, presenting an adequate amount for the number of birds that are to feed at the trough, staleness may be minimized.

This result is accomplished in the following manner:

The hopper 80 has inwardly converging lower sides 82 and 84 which form the bottom opening 86. The hopper is supported in any suitable manner over trough 88. One convenient method may be to mount it on legs 90 and 92 or the ends of the hopper may extend downwardly to form supports as at 93 in Fig. 14.

In the constructions previously described, the longitudinal space beneath the hopper was entirely open so that the feed could flow in the desired amounts laterally toward the edge of the trough. In some cases, however, it is desirable that the trough be much narrower or formed in a shape such as shown in Fig. 13. If a trough of this character is used, the feed when agitated in the manner heretofore described will flow outwardly in the usual manner, but because of the limited width of trough it may pile up to a predetermined but somewhat greater depth. If the depth is excessive, the birds may eat from the top layer only.

Accordingly, with a narrow trough or one shaped as in Fig. 13, I have found it desirable to incorporate baffles 94 and 96 which provide the dual result of additionally restraining the outward flow of feed and limiting the exposed surface area.

It will be noted in Figs. 14 and 15 that the baffles 94 and 96 are in the form of hinged plates or sheets which extend downwardly and outwardly from the lower longitudinal edges of the hopper 80. The hinge for baffle 94 is indicated at 98 and the hinge for baffle 96 is indicated at 100. The lower portion of each baffle is cut away in part as at 102 in baffle 94 and at 104 in baffle 96. It is through these cut away areas that the feed is exposed. The location of the cut away area with respect to the edges of the trough is such that the birds can easily reach the feed.

At the same time, however, the baffle provides means for limiting the amount of feed exposed so that the exposed surface layers will be eaten before they have a chance to become stale. The shape of the cut away areas may be varied in accordance with the width of the trough, the slope of the baffles and the number of birds that will feed at the trough in question.

While the baffles have been shown as hingedly connected to the lower longitudinal edges of the hopper, they may, if preferred, be rigidly connected thereto.

Extending longitudinal under the hopper opening is the agitator which has already been described. The agitator in Figs. 13, 14 and 15 is indicated at 106 and 108. 106 is the supporting bar and 108 is the saw tooth blade. The agitator passes under the hopper and through the shallow entrance way 110 which is small enough to prevent any substantial loss of feed.

In Fig. 15 it will be noted that the agitator bar 108 is connected in the manner already described with respect to Figs. 1 and 2, to platform 110 on which the birds step to induce periodic oscillation of the agitator.

The operation of the construction of Figs. 13, 14 and 15 is as follows: A quantity of feed is placed in hopper 80. The feed falls through opening 86 to the bottom of the trough and tends to spread laterally. The consistency of the feed is such that lateral movement is limited and will not proceed unless it is agitated in the manner heretofore set forth.

Upon movement of agitator 108, the feed travels laterally until it comes into engagement with the undersides of baffles 94 and 96 and the portion of the feed which travels through cut away areas 102 and 104 ceases its outward movement when it comes substantially into the planes of the baffles. The position assumed by the feed at this state is indicated in Fig. 13 by the granular indicators adjacent the baffle 94. The feed might extend a slight distance beyond the base of the baffle, sloping upwardly to the underside of the top portion of the baffle where it is definitely engaged.

In general, however, the design is such that the exposed surface will be about in the plane of the baffle. These exposed areas present fresh food to the birds who forthwith proceed to eat it. In a manner well known, the birds step on and off the platforms 110 located at opposite ends of the trough and move agitator bar 108 back and forth. The feed is thus driven outwardly little by little as the agitation proceeds until the portions of the feed that have been eaten away in the open areas are replaced.

When the feed again arrives at about the plane of the baffle, outward movement ceases as the resistance that is built up by the feed in such position is more than the periodic movement of the agitator bar can overcome. Thus, it will be seen that in both the constructions disclosed in Figs. 1 to 8 and in Figs. 13 to 15, the outward movement of the feed is limited. In Figs. 1 to 8, it is limited solely by the resistance of the feed itself, while in Figs. 13 to 15 it is limited partly by the consistency of the feed and partly by the added resistance imparted by the baffle.

It will be understood, of course, that the shape of the cut away areas of the baffle may be varied both as to their height and width and likewise the slope of the baffle may be changed, all for the purpose of meeting the conditions presented by the particular feed that is used.

In all constructions, it is contemplated that staleness be minimized by presenting to the birds as small a usable volume as possible, thus insuring a consumption of the exposed feed while it is still fresh and the replacement thereof by additional fresh feed.

It is to be understood that the present invention performs in the intended manner only when certain kinds of feed are used therewith. The general description of the kind of feed that I have found is moved in the intended manner by the agitator is called mash and may be of any of the principal types of mash: namely, laying mash or egg mash, chick mash or starting mash, and growing mash. Chicken mashes are of complicated physical structure in that they are composed of a large number of ingredients ground to small grain size and finally mixed together. Because of the physical properties of the different materials, the resultant mix has flow characteristics which are peculiar to this type of product. It is impossible to describe the grain size as being between any particular limits because of the varying ingredients and the grain sizes to which they are customarily ground. In general, however, the size of the grains of the smaller materials varies from .003 to .010 inch, but there is a certain amount of larger particles that comes from materials such as the husks of bran and the fairly long fibers from oats. These larger particles tend to retard the free flow of the smaller particles by providing a group of irregularly disposed, relatively large-sized elements within the mash.

A typical formula of mash that I have found to flow satisfactorily under the influence of my agitator is that manufactured by Eastern States Farmers' Exchange of Springfield, Massachusetts, which consists of the following per ton of material:

| | Pounds |
|---|---|
| Wheat bran | 300 |
| Yellow corn meal | 280 |
| Ground oats | 249.5 |
| Wheat flour middlings | 240 |
| 50 per cent protein meat scraps | 200 |
| Ground barley | 160 |
| Cane molasses | 120 |
| 41 per cent protein soybean oil meal | 100 |
| 58 per cent protein fish meal | 100 |
| Alfalfa leaf meal | 80 |
| Oyster shell meal | 80 |
| Corn gluten meal | 60 |
| Iodized salt | 20 |
| Fortified sardine oil | 10 |
| Manganese sulphate | .5 |
| | 2,000 |

The foregoing detailed description of the mash is given as the flow characteristics of the mash bears a relationship to the thickness of the agitator bar and the angularity of the teeth. It is not to be understood, however, that applicant's invention is to be limited to use with this particular type of mash, but rather that applicant has found that this type of mash operates satisfactorily with the agitator mechanism disclosed.

I claim:

1. A poultry feeder comprising a trough, a hopper for containing chicken mash, said hopper positioned over said trough and spaced therefrom, an agitator bar extending lengthwise of said trough and under the bottom opening of said hopper, means exterior of said trough against which birds may exert a force, and means connecting said exterior means to said agitator bar so that alternating movement of said exterior means under the influence of force applied thereto by a bird will cause longitudinal oscillating movement of said agitator bar, said agitator bar having a plurality of indentations along the sides thereof, which indentations are effective to cause lateral movement of said mash until a determinable quantity has flowed into said trough, after which continued longitudinal oscillating movement of said agitator bar through said mash will cause no further flow of said mash into said trough.

2. A poultry feeder comprising a trough, a hopper for containing chicken mash, said hopper positioned over said trough and spaced therefrom, an agitator bar extending lengthwise of said trough and under the bottom opening of said hopper, platforms at both ends of said trough, and lever arms connecting said platforms to said agitator bar, the lever arrangement being such that when one platform is moved downwardly, the agitator bar will be moved toward the other end of the trough and the other platform will be raised, whereby oscillating movement of said agitator bar will take place through the force applied to the platforms by birds stepping thereon, said agitator bar having a plurality of substantial indentations along the sides thereof, which indentations are effective to cause lateral movement of said mash until a determinable quantity has flowed into said trough, after which continued longitudinal oscillating movement of said agitator bar through said mash will cause no further flow of said mash into said trough.

3. A poultry feeder comprising a trough, a hopper for containing chicken mash, said hopper positioned over said trough and spaced therefrom, an agitator bar resting on the bottom of said trough and extending lengthwise thereof under the bottom opening of said hopper, said agitator bar having a plurality of substantial indentations along the sides thereof, said indentations being of such depth and angularity that longitudinal movement in one direction will force a limited quantity of mash laterally by virtue of the wedge-like engagement of the advancing forward edges of the indentations against said mash and at the same time will provide a void behind the trailing edge of said indentations whereby a limited amount of mash will fall downwardly into said void, and means connected to said agitator bar for causing oscillating longitudinal movement thereof upon the application of force to said means by said poultry, the formations of said agitator bar being incapable of producing further movement of feed laterally into said trough after the feed has flowed laterally in said trough a determinable amount.

4. A poultry feeder comprising a trough, a hopper for containing chicken mash, said hopper positioned over said trough and spaced therefrom, an agitator bar extending lengthwise of said trough and under the bottom opening of said hopper, the ends of said agitator bar extending through openings in the ends of said trough for a limited distance therebeyond, a yoke pivotally mounted at each end of said trough, a lever on each yoke, each lever connected to the corresponding end of said agitator bar, the leverage being such that the force exerted by a bird against said yoke will be sufficient to move said agitator bar longitudinally against the resistance afforded by said mash, said yokes providing means for causing longitudinal oscillation of said agitator bar, and a plurality of teeth along the sides of said agitator bar of such number and depth that limited movement of said agitator bar will be sufficient to cause lateral flow of said mash to a predetermined depth in said trough, after which continued movement of said agitator bar through said mash will cause no further flow of said mash into said trough.

5. A poultry feeder comprising a trough, a hopper for containing feed and positioned thereabove, an agitator bar extending along the trough bottom and below the hopper, and means operable by birds for causing reciprocating movement of said bar, said bar having serrated edges and being capable when reciprocated of causing positive lateral movement of feed toward the trough sides until the feed accumulates to a determinable depth.

6. A poultry feeder as set forth in claim 5, in which the bird-operable means comprises a pair of platforms, and levers connecting the platforms with said agitator bar, whereby when one platform descends, the other ascends, and the agitator bar is moved longitudinally.

7. A poultry feeder as set forth in claim 5 in which the bird-operable means comprises a shaft extending transversely of said agitator bar, a platform mounted transversely of said shaft so that tilting of said platform will cause rotary movement of said shaft, and a connection between said shaft and said agitator bar to translate rotary movement of said shaft into longitudinal movement of said agitator bar.

8. A poultry feeder as set forth in claim 5, in which the bird-operable means comprises a movable frame outboard of said trough and positioned to invite pressure thereagainst by a bird seeking feed from said trough, a leverage supplying connection between said frame and said agitator bar whereby movement of said frame will cause longitudinal movement of said agitator bar in one direction, and a second movable frame similarly connected to said agitator bar at the opposite side of said trough.

9. A poultry feeder comprising a trough, a hopper for containing chicken mash, said hopper positioned over said trough and spaced therefrom, an agitator bar extending lengthwise of said trough and under the bottom opening of said hopper, means exterior of said trough against which birds may exert a force, means connecting said exterior means to said agitator bar so that alternating movement of said exterior means under the influence of force applied thereto by a bird, will cause longitudinal oscillating movement of said agitator bar, and means for limiting the lateral movement of the mash from said agitator bar, said limiting means comprising a sheet of material extending from the edge of the bottom opening of said hopper downwardly and outwardly to the trough bottom, said sheet being cut away at its lower portion, whereby a limited area only of feed will be exposed to the air and further outward movement of the feed will be prohibited until such time as the exposed surface layer has been removed.

10. A poultry feeder comprising a fixed trough, a hopper for containing chicken mash, said hopper positioned over said trough and spaced therefrom, an agitator bar having a plurality of indentations along its side and extending lengthwise over the bottom of said trough and under the bottom opening of said hopper, means connected with said agitator bar against which birds may apply a force to cause oscillating movement of said agitator bar, and a baffle extending downwardly and outwardly away from the edge of the bottom opening of said hopper, said baffle being cut away along its lower edge whereby the exposed surface area of said feed may be limited.

11. A poultry feeder as set forth in claim 10 in which said baffle is hingedly connected to said hopper.

12. A poultry feeder comprising a trough, a hopper for containing feed and positioned thereabove, an agitator bar extending along the trough bottom and below the hopper, means operable by birds for causing reciprocating movement of said bar, said bar having serrated edges and being capable, when reciprocated, of causing a positive lateral movement of feed toward the trough sides and means for restraining the lateral movement of said feed beyond a predetermined point, said means comprising a baffle plate which extends in an outwardly sloping direction from the hopper bottom, said baffle plate having cut away areas of such width as to provide a space immediately above the trough bottom and at the same time to present sufficient resistance so that the outward flow of feed will stop when the surface of that portion of the feed that it exposed at the cut away areas reaches a position where it is more or less in the plane of said baffle plate, even though oscillating movement of said agitator bar is continued.

13. A poultry feeder as set forth in claim 12 in which said baffle plate is hingedly connected to said hopper.

14. A poultry feeder as set forth in claim 12 in which said baffle plate has downward extensions which normally engage the trough bottom.

JOHN J. CARMO.